United States Patent [19]

Puchinger et al.

[11] Patent Number: 5,700,743
[45] Date of Patent: Dec. 23, 1997

[54] CARBON FIBER-REINFORCED COMPOSITE MATERIAL WITH A LAYER WHICH PROVIDES PROTECTION AGAINST EROSION

[75] Inventors: Franz Puchinger, Pfaffenhofen; Axel Rossman, Karlsfeld; Siegfried Sikorski, München; Gerhard Wydra, Oberschleissheim, all of Germany

[73] Assignee: MTU Motoren-Und Turbinen-Union München GmbH, München, Germany

[21] Appl. No.: 814,446

[22] Filed: Mar. 10, 1997

Related U.S. Application Data

[63] Continuation of Ser. No. 361,591, Dec. 22, 1994, abandoned.

[30] Foreign Application Priority Data

Dec. 22, 1993 [DE] Germany .................. 4343904.7

[51] Int. Cl.$^6$ .................................. B32B 5/16
[52] U.S. Cl. .............. 442/243; 442/281; 442/285; 442/417; 428/337; 428/339
[58] Field of Search ................. 442/243, 281, 442/285, 417; 428/337, 339

[56] References Cited

U.S. PATENT DOCUMENTS

| | | | |
|---|---|---|---|
| 4,035,550 | 7/1977 | Suh et al. | 428/336 |
| 4,339,490 | 7/1982 | Yoshiola et al. | 428/213 |
| 4,838,942 | 6/1989 | Puchinger et al. | 106/286.1 |
| 4,992,318 | 2/1991 | Gadkaree | 428/114 |
| 4,997,693 | 3/1991 | Sonoh et al. | 428/339 |
| 5,433,995 | 7/1995 | Matthews et al. | 428/408 |

FOREIGN PATENT DOCUMENTS 3644116  7/1988  Germany .

*Primary Examiner*—Christopher Raimund
*Attorney, Agent, or Firm*—Ladas & Parry

[57] ABSTRACT

A structural component which consists of a fiber-reinforced, composite material is provided with a protective coating against erosion. The protective coating includes an adhesion-promoting, intermediate layer on the component, an electrically insulating baked, inorganic lacquer layer for protection against erosion and an electrically conducting covering layer, for protection against lightning strikes. The covering layer consists of a baked and compressed inorganic lacquer and the lacquer of the lacquer layer and of the covering layer is baked on the component below the temperature which causes damage to the structural component or below the softening or decomposition temperature of the component. The protective layer is advantageously used for the external components of propulsion units, such as housings, nose cones or fan blades.

18 Claims, 1 Drawing Sheet

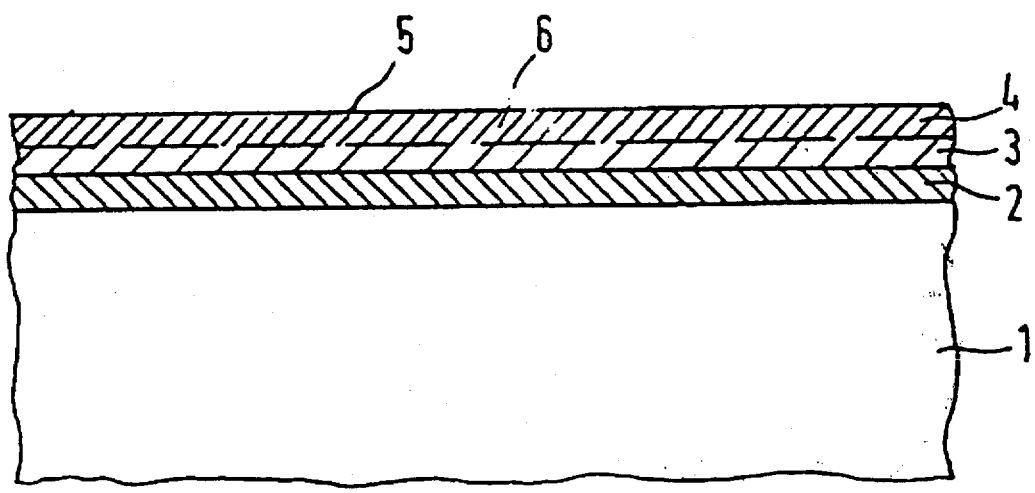

CARBON FIBER-REINFORCED COMPOSITE MATERIAL WITH A LAYER WHICH PROVIDES PROTECTION AGAINST EROSION

This application is a continuation of application Ser. No. 08/361,591 filed on Dec. 22, 1994, now abandoned.

FIELD OF THE INVENTION

The invention relates to a structural component, which is made from a fiber-reinforced composite material and is provided with a protective coating to protect the component against erosion.

BACKGROUND AND PRIOR ART

Structural components made from a fiber-reinforced composite material are particularly subject to erosion at the outer surface and in the flow channel of propulsion units by abrasive particles in the stream of air. At the outer surface of the propulsion unit, the danger also exists of damage to, or destruction of, the component as a result of lightning strikes, especially in the case of non-metallic fiber-reinforced composite materials. Because of their lower density, such composite materials are used in greater frequency for the outer parts of propulsion units, such as turbines, as for example, in the nose cone, the housing or the fan blades. Lightning strikes on these components can lead to de-lamination or fracture of the component so that the operation of the entire propulsion unit is endangered.

A protective coating is disclosed in DE-36 44 116 which consists of an inorganic lacquer which is capable of being used at temperatures below the softening temperature or the decomposition temperature of non-metallic composite materials. A disadvantage of this inorganic lacquer layer is that, as a result of its low baking temperature, it contains incompletely reacted residual ingredients whereby, despite metallic fillers, the inorganic lacquer layer acts in an insulating manner and corrosively attacks metallic adhesion layers of the material of the structural component itself. A further disadvantage of the lacquer layer is that its adhesion to structural components which consist of carbon, or which has been reinforced with carbon fibers, is not adequate to avoid breaking away or peeling of the lacquer layer due to high mechanical or electrical stresses.

It is also known to incorporate metallic wire fabrics or netting into the outer layers of a fiber composite material by the process of lamination in order to provide protection against lightning strikes. A disadvantage of this arrangement is, on the one hand, there is a high cost to manufacture the laminate with wire fabrics or netting close to the surface by lamination and, on the other hand, there is low surface coverage of the wire fabric or netting.

SUMMARY OF THE INVENTION

An object of the invention is to provide a component of the above type which overcomes the disadvantages of the prior art and which protects the fiber composite material effectively both against erosion and lightning strikes by means of a protective coating.

The above object is accomplished by forming the protective coating with an adhesion-promoting intermediate layer on the surface of the structural component, an electrically insulating, baked inorganic lacquer layer on the intermediate layer for protection against erosion and an electrically conducting outer or covering layer, for protection against lightning strikes, the outer layer consisting of a baked and compressed inorganic lacquer. The lacquer for the lacquer layer and for the covering layer is capable of being baked below the temperature at which damage occurs to the component and, in particular below the softening temperature or the decomposition temperature of the component.

The component according the invention has the advantage that is uses inorganic lacquer systems which are known from the prior art and their ability to adhere and their electrical conductivity are modified in such a way that a level of protection against erosion and lightning strikes is achieved for fiber composite components which is improved with regard to the prior art.

In order to improve the adhesion capacity property of the protective coating, the intermediate layer preferably consists of glass fibers with a matrix material made of plastic. The aforementioned lacquer ingredients, which are not completely reacted during baking, do not, on the one hand, attack such matrix material and, on the other hand, the layer of inorganic lacquer adheres strongly to the component after baking as a result of reactions of the matrix material with active lacquer components, provided that the intermediate layer has been applied beforehand or is prepared simultaneously in the form of an outer layer on the component during the manufacture of the component. A further advantage is that use can be made of the same inorganic lacquer, in the form in which it is disclosed, for example, in DE-36 44 116, both for the electrically insulating layer and for the electrically conducting covering layer.

The adhesion-promoting intermediate layer can also preferably consist of glass fiber reinforced plastic. This has the advantage that, on the one hand, large differences in the thermal expansion properties between the component and the protective coating can be nullified b optimizing the strengthening of the intermediate layer by the glass fibers by alignment of the fibers and, on the other hand, the matrix material reacts with the active lacquer components and thus the inorganic lacquer layer adheres especially strongly to the structural component after baking.

The inorganic lacquer layer preferably includes a filler, which consists of aluminum powder, and forms an electrically insulating layer because of the incompletely reacted ingredients of the inorganic lacquer during baking, especially since the aluminum powder is partly coated with oxide layers because of the atmosphere used during baking. An aluminum filler has the advantage that high electrical conductivity can be achieved in the region near the surface as a result of post treatment of the baked layer.

As a result of an appropriate selection of the binder for the inorganic lacquer, the filler is deoxidized and baked below the softening temperature or decomposition temperature of the component so that the formation of an electrically conducting covering layer, which consists of the compressed, inorganic lacquer, is facilitated.

It is especially advantageous if the lacquer layer and the covering layer have the same starting materials. This reduces storage costs and processing and ensures a problem-free transition from the lacquer layer to the compressed, and electrically conducting, covering layer.

A further advantage is provided by the protective coating when the covering layer is a titanium, fire-retarding layer since all the components in the flow channel of a propulsion unit can be constructed with the protective coating in accordance with the invention. High productivity can be achieved by making the type of coating uniform and reducing the coating variants. However, this uniformity is limited by the operating temperatures which are permitted whereby these are, in essence, limited by the material of the matrix of the composite materials. In this respect, the highest operating temperatures are resisted by ceramic matrix materials and, preferably, components which consist of carbon which has been reinforced by carbon fibers with the exclusion of oxygen. The lowest operating temperatures are preferably resisted by components which consist of carbon fiber-reinforced plastics which are used with advantage in the external regions of propulsion units and for fan blades.

A further object of the invention is to provide a process for producing a structural component made of fiber-reinforced composite material with a protective coating, which avoids the disadvantages of the known time-consuming manufacturing procedures for providing means, such as layers of wire fabric, in order to confer protection against damage by lightning and erosion.

The above object is accomplished by the following steps:

a) applying glass fibers in the form of an outer layer of fibers on the component during its manufacture, the component consisting of a fiber-reinforced composite material, for the formation of a glass fiber-reinforced, adhesion-promoting intermediate layer whereby the glass fibers of the intermediate layer are embedded in the same plastic matrix as the component whereby the intermediate layer is integrated with the component. Alternatively, the intermediate layer is formed from an additional layer of plastic matrix when the components are made from ceramic composite materials;

b) applying several successive inorganic, lacquer layers on the component;

c) baking the inorganic lacquer layers at temperatures below a temperature which causes damage to the component or below the softening or decomposition temperature of the component; and d) compressing an outer layer of the baked lacquer layers to produce an electrically conducting covering layer by means of blasting with spherical particles, rolling, radial compressing and/or brushing.

This process has the advantage that it is suitable for mass production.

The preparation of the surface between the individual coating steps depends on the properties and the composition of the material of the component and of the coatings. Degassing is advantageously used in the case of ceramic composite materials whereas roughening and/or cleaning of the outer surface is preferably employed for the components or the intermediate layer formed on components made of fiber-reinforced plastics.

Lacquering of the component in several layers has the advantage that the thickness of the protective coating can be increased step-wise and the protective coating can, correspondingly, be removed step-wise as a result of erosion by abrasive particles in the flow channel of a propulsion unit.

In the case of fiber-reinforced plastics, the baking process which takes place below the temperature which causes damage to the component or the softening temperature or decomposition temperature of the component is preferably carried out below 200° C. so that neither softening of the plastic nor decomposition of the component are risked. In the case of components which consist of carbon, which has been reinforced by carbon fibers, higher baking temperatures of up to 500° C. are possible though it has been found in the case of these components that glass fiber reinforced plastic or the pure matrix material of the glass fiber reinforced plastic can be used as the adhesion-promoting intermediate layer so that, here also, a baking temperature below 200° C. is advantageously employed.

In the case of these low baking temperatures, incompletely reacted ingredients of the lacquer remain in the protective coating so that these then act in an electrically insulating manner after baking and thus offer no protection against lightning strikes.

In a way which could not be foreseen, a compacted electrically conducting layer was achieved at the surface of the inorganic lacquer layer, by compressing the lacquer layer, after baking, by means of blasting with spherical particles, rolling, compressing and/or brushing so that complete protection against lightning strikes can be achieved in an advantageous way with this coating process.

BRIEF DESCRIPTION OF THE DRAWING

The sole FIGURE of the drawing is a cross-section taken through a protective coating on a component in accordance with the invention.

DETAILED DESCRIPTION OF A PREFERRED EMBODIMENT

The drawing shows a structural component, for example, part of a base or core of a fan blade 1, formed from layers of reinforcing fibers which have been pre-impregnated with a matrix material, for example, carbon fibers which have been completely embedded in a plastic matrix. The plastic matrix can be, for example, an epoxide resin, a phenol resin or a polyimide resin which is subjected to a heat treatment during the manufacturing process in order to cross-link the molecular chains. During heat treatment at a temperature of 120° to 180° C., the preimpregnated fiber layers are subjected to a pressure of 80 kPa to 2 MPa in a mold in order to provide compression and shaping and the fiber layers harden to completion in this way. In accordance with the invention, the outermost layers of the component are provided with glass fiber fabrics, unidirectional glass fiber strips, short glass fibers or plaited glass tubes. In this example, these outermost glass fiber layers are embedded in the same matrix material as the reinforcing fibers from which the component is made. The glass fiber-containing layers form an intermediate layer 2 integrated with the structural component 1. The thickness of the intermediate layer 2 of glass fiber reinforced plastic is 0.05 to 1 mm.

An inorganic lacquer layer 3, 4 is then applied onto the intermediate layer 2 in the form of several thin layers. The inorganic lacquer was the same as disclosed in DE-36 44 116, and includes aluminum powder as a filler. An electrically non-conducting coating is present after baking the lacquer layers 3, 4 at a temperature of 150° to 190° C. The layer 4, at the surface, of the baked inorganic lacquer layers 3, 4 is then produced by compressing the surface of the lacquer layers by blasting with spherical particles so that the initially electrically non-conducting coating is formed with an electrically conducting, compacted covering layer 6 in the outer surface region of the coated component. Brushing of the outer surface 5 has proven to be valuable prior to blasting with the spherical particles because, in this way, both the residence time in the blasting operation with the spherical particles and the electrical resistance of the conducting covering layer can be further reduced. In this example, spherical glass beads with an average diameter of 40 to 80 mm are used for the blasting operation.

Although the invention has been disclosed with reference to a preferred embodiment, it will become apparent to those skilled in the art that numerous modifications and variations can be made within the scope and spirit of the invention as defined in the attached claims.

What is claimed is:

1. A structural component comprising a base made of a carbon fiber-reinforced composite material and a protective coating on said base for protecting said base against erosion, said protective coating comprising an adhesion-promoting intermediate layer on a surface of the base, an electrically insulating, baked, inorganic lacquer layer on said adhesion-promoting layer for protection against erosion and an electrically conducting covering layer, for protection against lightning strikes, on said inorganic lacquer layer, said covering layer comprising a baked and compressed inorganic lacquer, the lacquer of said lacquer layer and of said covering layer being baked at a temperature below a temperature which causes damage to the base or softening of the base or decomposition of the base, said adhesion-promoting, intermediate layer consisting essentially of a plastic matrix material containing glass fibers.

2. A structural component as claimed in claim 1, wherein said adhesion-promoting intermediate layer is integrated with said base and its plastic matrix material is the same as said base but with said glass fibers embedded therein instead of the carbon fibers in said base.

3. A structural component as claimed in claim 1, wherein said inorganic lacquer layer includes a filler which consists of aluminum powder.

4. A structural component as claimed in claim 1, wherein said lacquer layer and said covering layer are composed of the same materials.

5. A structural component as claimed in claim 1, wherein said covering layer is a titanium fire-retarding layer.

6. A structural component as claimed in claim 1, wherein said material of said base consists of a plastic containing said carbon fibers.

7. A structural component as claimed in claim 1, wherein said material of said base consists of a ceramic material reinforced with said carbon fibers.

8. A structural component as claimed in claim 1, wherein said intermediate layer has a thickness between 0.05 and 1 mm.

9. A structural component as claimed in claim 1, which is selected from the group consisting of turbine housings, turbine fan blades and turbine nose cones.

10. A process for the manufacture of a component having a base formed of a carbon fiber reinforced, composite material provided with a protective covering against erosion, said process comprising:

forming an outermost glass fiber reinforced adhesion-promoting layer on the base of carbon fiber reinforced composite material by embedding glass fibers in a plastic matrix;

coating the adhesion-promoting layer with an inorganic lacquer in several, consecutive layers;

baking the inorganic lacquer at a temperature below a temperature which causes damage to the base or the softening temperature or the decomposition temperature of the base; and compressing the lacquer coating after baking to confer electrically conducting properties to an outer covering portion of the lacquer coating to form an outer covering layer.

11. A process as claimed in claim 10, wherein said compressing of the lacquer coating is effected by blasting the outer surface of the lacquer coating with spherical particles.

12. A process as claimed in claim 10, wherein said compressing of the lacquer coating is effected by applying a roller on the outer surface of the lacquer coating.

13. A process as claimed in claim 10, wherein said compressing of the lacquer coating is effected by applying radial compression to the outer surface of the lacquer coating.

14. A process as claimed in claim 10, wherein said compressing of the lacquer coating is effected by brushing the outer surfaces of the lacquer coating.

15. A process as claimed in claim 10, wherein the temperature of baking of the inorganic lacquer is less than 200° C.

16. A process as claimed in claim 10, wherein the composite material of the base is the same as the plastic matrix in which the glass fibers of the adhesion-promoting, intermediate layer are embedded.

17. A process as claimed in claim 10, wherein the composite material of the base is a ceramic, said plastic matrix of the adhesion-promoting layer being applied on said base.

18. A process as claimed in claim 10, wherein the adhesion-promoting, intermediate layer is formed with a thickness of between 0.05 and 1.0 mm.

* * * * *